N. POWER.
INDICATOR FOR FILM MAGAZINES.
APPLICATION FILED JULY 14, 1913.
1,208,646.
Patented Dec. 12, 1916.
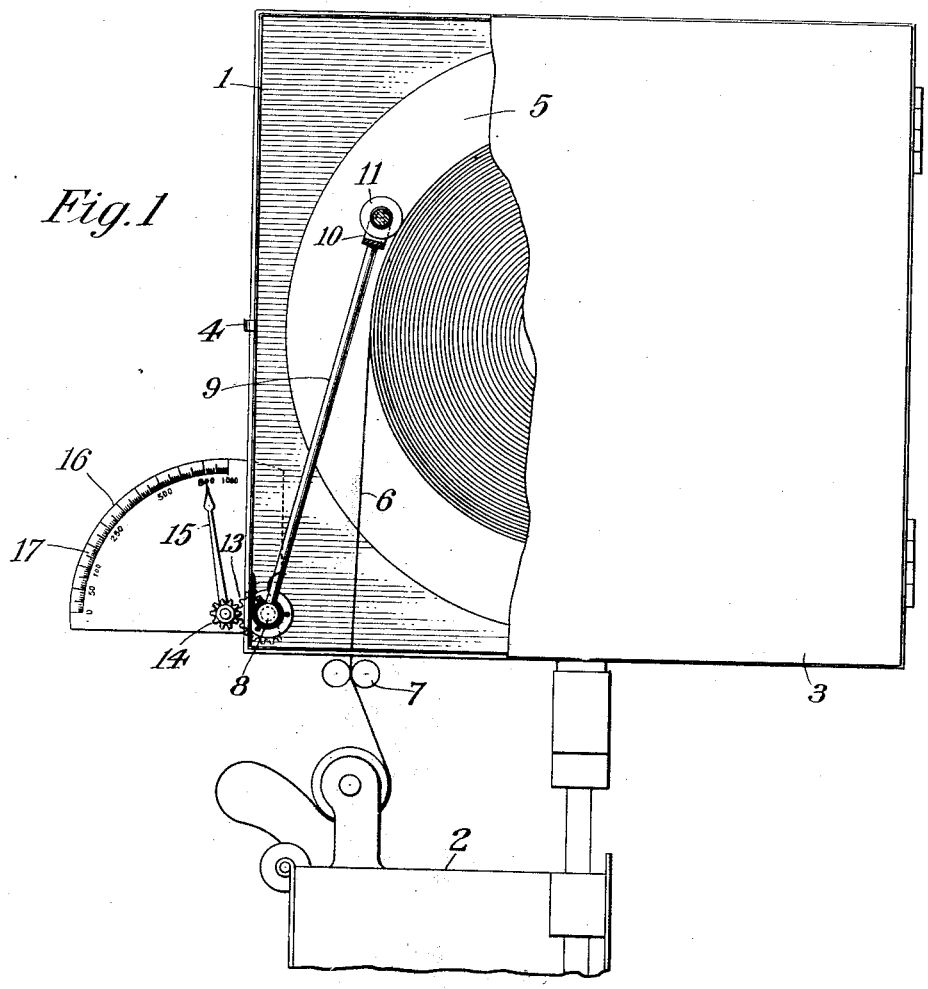
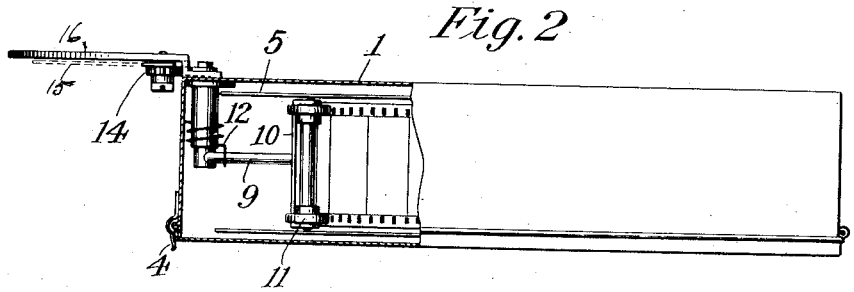
Witnesses:
L. E. Johnston
W. J. Robinson
Inventor
Nicholas Power
By his Attorney
W. B. Morton

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

INDICATOR FOR FILM-MAGAZINES.

1,208,646.  Specification of Letters Patent.  Patented Dec. 12, 1916.

Application filed July 14, 1913. Serial No. 778,887.

*To all whom it may concern:*

Be it known that I, NICHOLAS POWER, a citizen of the United States, and resident of Brooklyn, in the county of Kings and State of New York, have invented new and useful Improvements in Indicators for Film-Magazines, of which the following is a specification.

This invention relates to indicators for film magazines of motion picture machines and has for its object to provide an indicator which will show to the operator at a glance the exact length of film remaining in the magazine to be projected.

In motion picture apparatus the strip of film carrying the pictures is wound on a reel and placed in a fire-proof magazine from which it is fed through a fire-proof valve and through the projecting apparatus and thence into a receiving reel in the second fireproof magazine. As long as the magazines are kept securely closed the danger from fire is slight as the length of film exposed in the process of projection is too small to produce a serious conflagration even should it become ignited. It is desirable for the operator to know when he is nearing the end of the reel so that he may be getting things ready for the next display and not delay the exhibition. Operators will therefore, although they are expressly directed to the contrary, frequently open their magazines from time to time to ascertain the amount of film left on the reel with the result that serious fires have sometimes occurred. With my invention all necessity for opening the magazine is entirely removed as the indicator shows more clearly and accurately than the operator could ascertain on inspection, the amount of film still remaining to be projected.

My invention also provides an improved indicator which may readily be applied to magazines now in use without lessening their fireproof qualities and without material expense, and my device does not in the least interfere with the projection of the pictures, nor does it in any way damage the film.

With the above objects in view my invention consists in the construction hereinafter described and illustrated in the accompanying drawings, in which—

Figure 1 is a side elevation of a film magazine equipped with my improved indicator; and Fig. 2 is a plan view of a portion of the same showing the details of construction.

Referring now to the drawings 1 indicates the magazine, which consists of a sheet metal box of a size sufficient to receive the reel, mounted on top of the projecting apparatus 2 and having one side hinged to form a door 3, which during the projection of the film is securely fastened by means of the latch 4. The reel 5 is mounted on a suitable spindle in the center of the magazine and the film 6 passes down into the machine through the magazine valve indicated at 7.

In the lower corner of the magazine a bearing is provided for a short shaft 8 which projects into the magazine and has attached to its free end an arm 9 projecting upwardly adjacent the periphery of the reel. At the upper end of the arm 9 a fork 10 is provided in which is rotatably mounted a roller 11 of a width to lie freely within the flanges of the reel. The roller 11 is provided with collars at each end which rest against the margins of the film leaving the middle portion out of contact with the picture carrying surface of the film. A spring 12 is provided for holding the roller lightly against the film on the reel.

The shaft 8 projects through the side wall of the magazine and to its outer end there is attached a geared sector 13 meshing with the pinion 14 on the hub of the pointer or indicator 15. Supporting the pointer and providing an index to indicate its position and extent of movement, I provide a sheet metal quadrant 16 spaced slightly from the wall of the magazine and attached thereto along its vertical edge. A scale 17, calibrated to indicate the number of feet remaining in the reel for different positions of the roller 11, is engraved or otherwise marked on the quadrant, the zero of the scale corresponding to the position of the pointer when the roller 11 is resting against the hub of the reel.

The operation of the device will be obvious from the drawings and description. When the reel to be exhibited is placed in the magazine the arm 9 is lifted against the tension of the spring turning the shaft 8, and through the gearing the pointer 15, back on the scale a distance depending on the radius of the reel and consequently on the length of the film which it contains. As the film is fed out of the magazine the roller 11 moves toward the center of the reel, due to the decreasing radius of the same, and consequently moves the pointer back toward the zero end of the scale which point it reaches when the film is entirely exhausted.

By gearing the pointer to the shaft 8 the necessarily slight angular movement of the arm 9 can be amplified to any extent desired to give a sufficiently accurate reading of the scale, and at the same time have its divisions sufficiently large to be readily discernible.

By the arrangement of the scale on the projecting plate 16 the indicator is clearly visible to the operator in his normal position and the entire device may be attached to magazines in use without interfering with the door or other parts thereof.

Having thus described my invention what I claim and desire to secure by Letters Patent is:

1. The combination with a magazine for moving picture films having a door forming one entire side thereof, of an indicator therefor comprising a shaft rotatably mounted in the rear wall of said magazine, an arm mounted on the shaft in the magazine and provided with a roller adapted to engage the film on the reel, a plate connected to the rear wall of said magazine and projecting beyond one edge of the latter, a scale marked on said plate and an indicator hand pivoted on said plate and having geared connection with said shaft.

2. The combination with a magazine for moving picture machines having one entire side thereof hinged to form a door, of an indicator for said magazine comprising an arm supported on the inside of the casing and independently of said door, a plate supported by said casing and projecting beyond the edge of the latter and having a scale marked on the face of the plate visible from the same side of the magazine as said door, an indicator hand coöperating with said scale, and operative connections between said arm and said indicator hand.

Signed at New York, in the county of New York and State of New York this 3rd day of July, 1913.

NICHOLAS POWER.

Witnesses:
W. B. MORTON,
W. J. ROBINSON.